(12) United States Patent
Shih

(10) Patent No.: US 7,210,237 B1
(45) Date of Patent: May 1, 2007

(54) MEASURING TOOL DEVICE

(76) Inventor: Mei-Huei Shih, 10F-2, No. 77-1, Zhonghua Rd., Qianjin Dist., Kaohsiung City (TW)

( * ) Notice: Subject to any disclaimer, the term of this patent is extended or adjusted under 35 U.S.C. 154(b) by 0 days.

(21) Appl. No.: 11/282,646

(22) Filed: Nov. 21, 2005

(51) Int. Cl.
*G01C 1/00* (2006.01)
*B43L 7/10* (2006.01)

(52) U.S. Cl. .......................... 33/471; 33/1 SD; 33/534
(58) Field of Classification Search ................ 33/471, 33/1 SD, 27.032, 27.07, 421, 424, 426, 534
See application file for complete search history.

(56) References Cited

U.S. PATENT DOCUMENTS

| | | | | |
|---|---|---|---|---|
| 1,262,971 A | * | 4/1918 | Olson | 33/41.2 |
| 2,480,914 A | * | 9/1949 | Gallington et al. | 33/471 |
| 2,545,935 A | * | 3/1951 | Warner | 235/61 S |
| 3,643,333 A | * | 2/1972 | Pepper | 33/1 SD |
| 3,721,007 A | * | 3/1973 | Banner | 33/1 SD |
| 3,844,042 A | * | 10/1974 | Hodge | 33/1 SD |
| 3,983,630 A | * | 10/1976 | Hamm et al. | 33/1 SD |
| 4,327,497 A | * | 5/1982 | Wyatt, Sr. | 33/274 |
| 4,625,409 A | * | 12/1986 | Arakawa | 33/1 N |
| 6,418,630 B1 | * | 7/2002 | Genevois | 33/1 SB |

* cited by examiner

*Primary Examiner*—Christopher W. Fulton
(74) *Attorney, Agent, or Firm*—Birch, Stewart, Kolasch & Birch, LLP

(57) ABSTRACT

A measuring tool device comprises a horizontal module including a depressed surface, an upper semicircular hollow, and a lower semicircular body; an upper cover module including a calibrated line at its periphery; and an accessory module in a semicircular protruded form and coupled between the horizontal module and the upper cover module. The accessory module is at the depressed surface, and the upper cover module is latched to the horizontal module by a latch. The accessory module is rotated and the indicating arrows on both ends of the straight edge correspond to a calibrated line at the periphery of the upper cover module. The straight edge of the body of the horizontal module is used as a starting edge, and the straight edge of the accessory module is used as an ending edge for measuring or drawing an included angle.

10 Claims, 7 Drawing Sheets

MEASURING TOOL DEVICE

FIELD OF THE INVENTION

The present invention relates to a measuring tool device, and more particularly to a measuring tool device connected to a horizontal module and capable of changing its interior angle, exterior angle, and supplementary angle according to the actual needs of a measurement or a drafting.

BACKGROUND OF THE INVENTION

The present measuring tools including a protractor, a ruler, and a right-angle gauge are independent protractor, ruler, and right-angle gauge for indicating an angle of 30°, 45°, 60°, and 90°, but these measuring tools do not provide other angles for quick drawings. If it is necessary to draw an angle other than those mentioned above, a protractor is needed. However, a general protractor includes a starting edge at the internal side of a straight edge and a center point disposed thereon. In the measurement of an angle, a small gap is produced between the straight edge and the starting edge, and thus users or students may take the straight line as a base and the center as the center point by mistake for the drawing. As a result, there is an error of the measured angle which is measured by using the center of the starting edge. In the present procedure of drawing an angle or a straight line of a specific length, it is necessary to draw the lines separately and then connect the lines to form an included angle or a figure with a different angle. As to the present measuring tools sold in the market, users have to use a combination of these measuring tools to draw the required angle or straight line of a specific length. If a student forgets to bring one of the measuring tools, the student may not be able to complete the drawing. These measuring tools usually provide a single function such as a protractor, a ruler, a triangle or a right-angle gauge, and thus the users can only draw an incomplete figure by one of these measuring tools. In the process of drawing a figure by using these measuring tools, a user may use any length in any direction or with a specific angle, but the user must carry the common protractor, ruler, triangle, or right-angle gauge to complete the required figure, and thus causing inconvenience for drawing figures by these measuring tools.

SUMMARY OF THE INVENTION

In view of the foregoing shortcomings of the prior art, the inventor of the present invention overcomes the shortcoming by providing a measuring tool device that allows users or students to rotate an accessory module and use the indicating arrows at both ends of a straight edge to correspond with the calibrations at the edge of the upper cover module. The straight edge of the horizontal module is used as the starting edge and the straight edge of the accessory module as the ending edge for measuring and drawing an included angle. The two indicating arrows on both ends can quickly and accurately indicate the interior angle and exterior angle, so that the measuring tool can draw a required angle or straight line by one stroke.

DETAILED DESCRIPTION OF THE PREFERRED EMBODIMENTS

Figure 1:
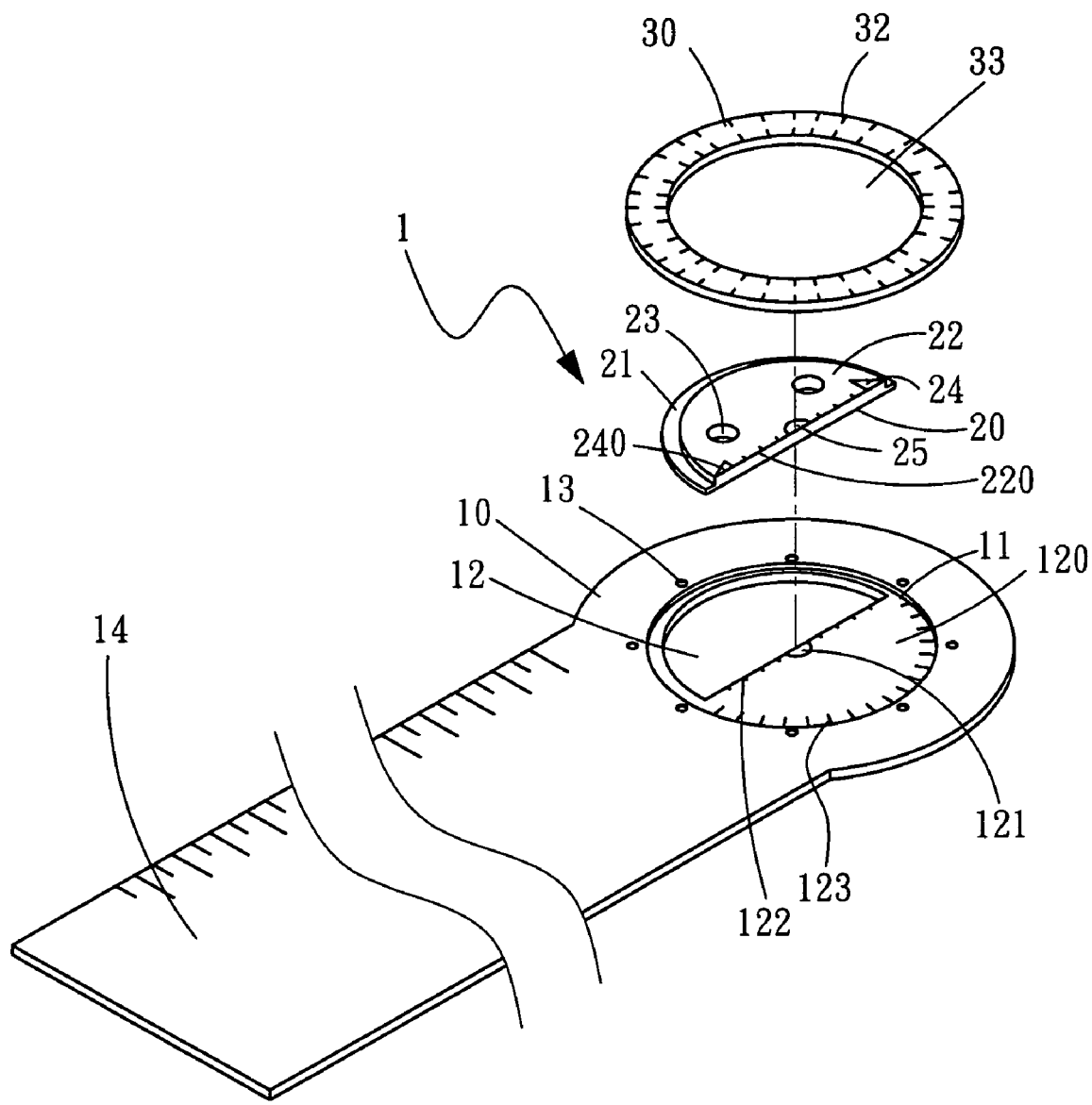
FIG. 1 is an exploded view of the present invention.
Figure 2A:
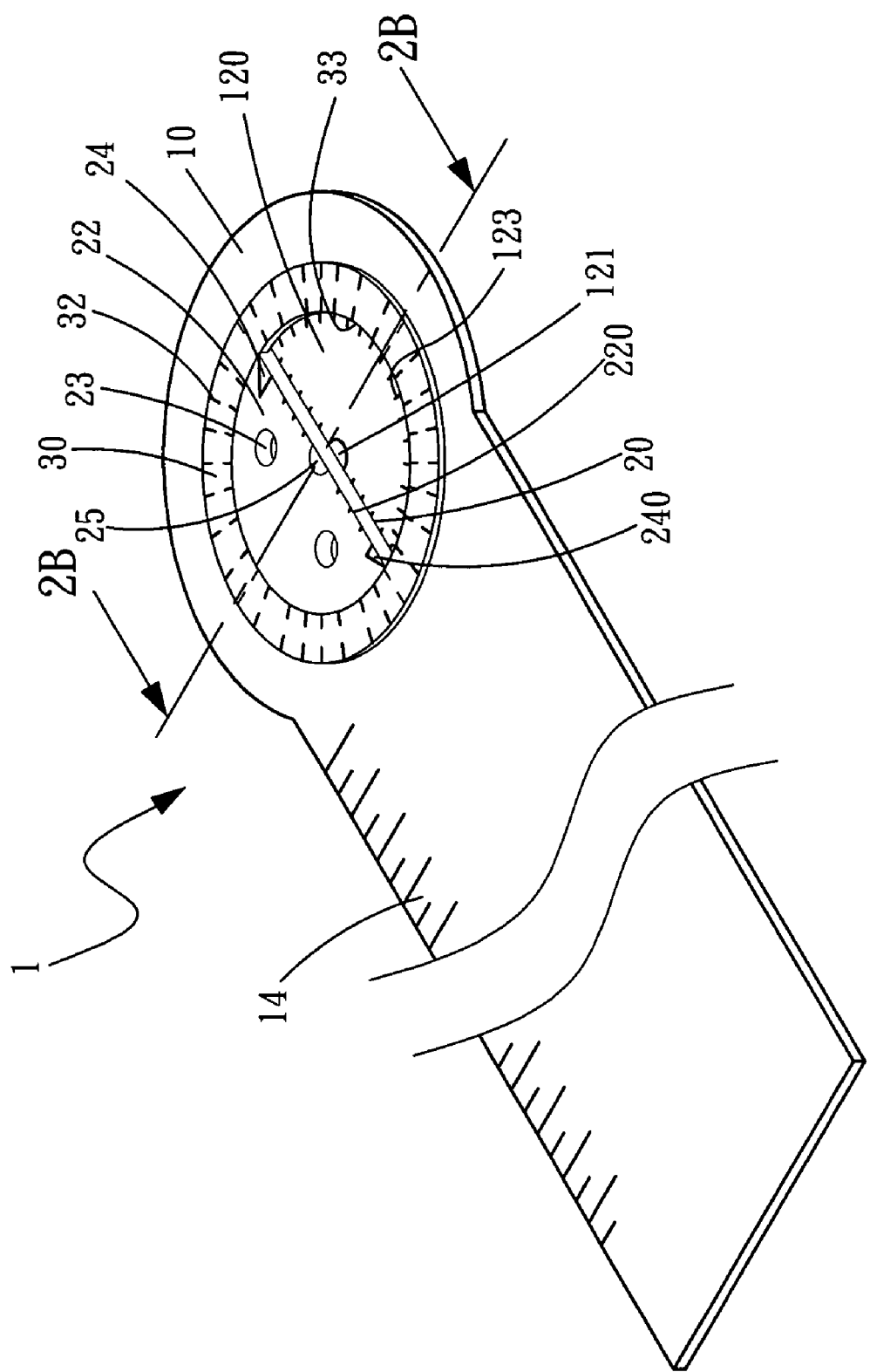
FIG. 2A is a perspective view of the present invention.
Figure 2B:
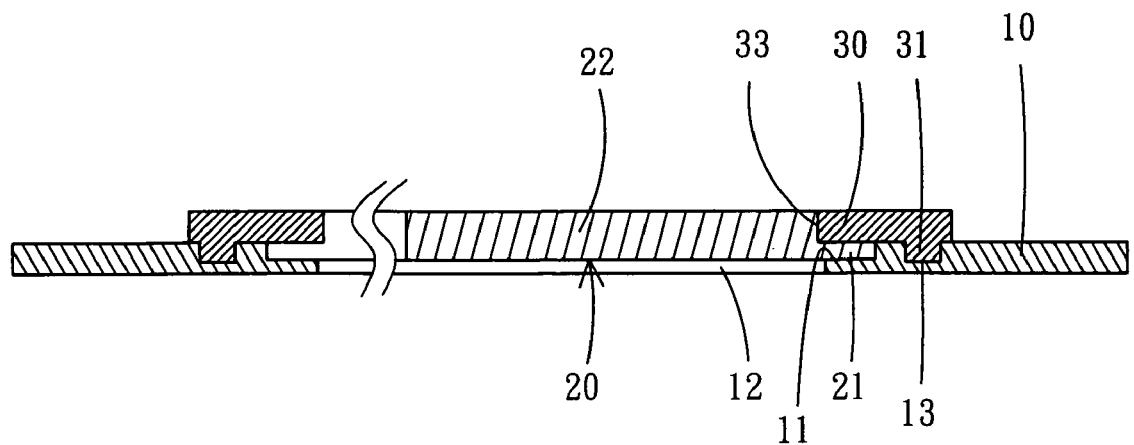
FIG. 2B is a cross-sectional view of Section 2B—2B as depicted in FIG. 2A.

Referring to FIGS. 1 and 2A, a measuring tool device 1 in accordance with the present invention comprises a horizontal module 10 having a depressed surface 11 disposed on one side, an upper semicircular hollow 12, and a low semicircular body 120; an upper cover module 30 having a calibrated line 32; and an accessory module 20 substantially in a protruded semicircular shape and disposed between the horizontal module 10 and the upper cover module 30. The horizontal module 10 and the upper cover module 30 are connected by a protruded latch 31 and a concave hole 13 (or a locking device or a rivet) as shown in FIG. 2B for facilitating the rotation of the accessory module 20 between the horizontal module 10 and the upper cover module 30.

The horizontal module 10 includes a depressed surface 11 on one side, and an upper semicircular hollow 12 and a lower semicircular body 120 disposed thereon. The lower semicircular body 120 includes an arc 121 disposed at the center of a distal surface, and the arc 121 have a starting edge 122 with a calibrated straight edge separately disposed on both sides of the arc 121 and a calibrated line 123 disposed at the external periphery of the arc 121, and the horizontal module 10 includes a plurality of concave holes 13 disposed evenly around the periphery of the horizontal module 10, and a horizontal ruler 14 extended outward from the horizontal module 10.

The accessory module 20 is a semicircular raised body 21 installed on one side of the depressed surface 11 of the horizontal module 10, and a semicircular surface body 22 is extended upward from the raised body 21, and a circular hole 23 is disposed on the semicircular surface body 22 and corresponding to the pressing position of the user's hand. The calibrated straight edge serves as an ending edge 220, and the ending edge 220 includes an indicating arrow 24, 240 disposed on both ends of the ending edge 220, and an arc 25 is disposed at the center and corresponding to the arc 121 of the horizontal module 10.

Figure 9:
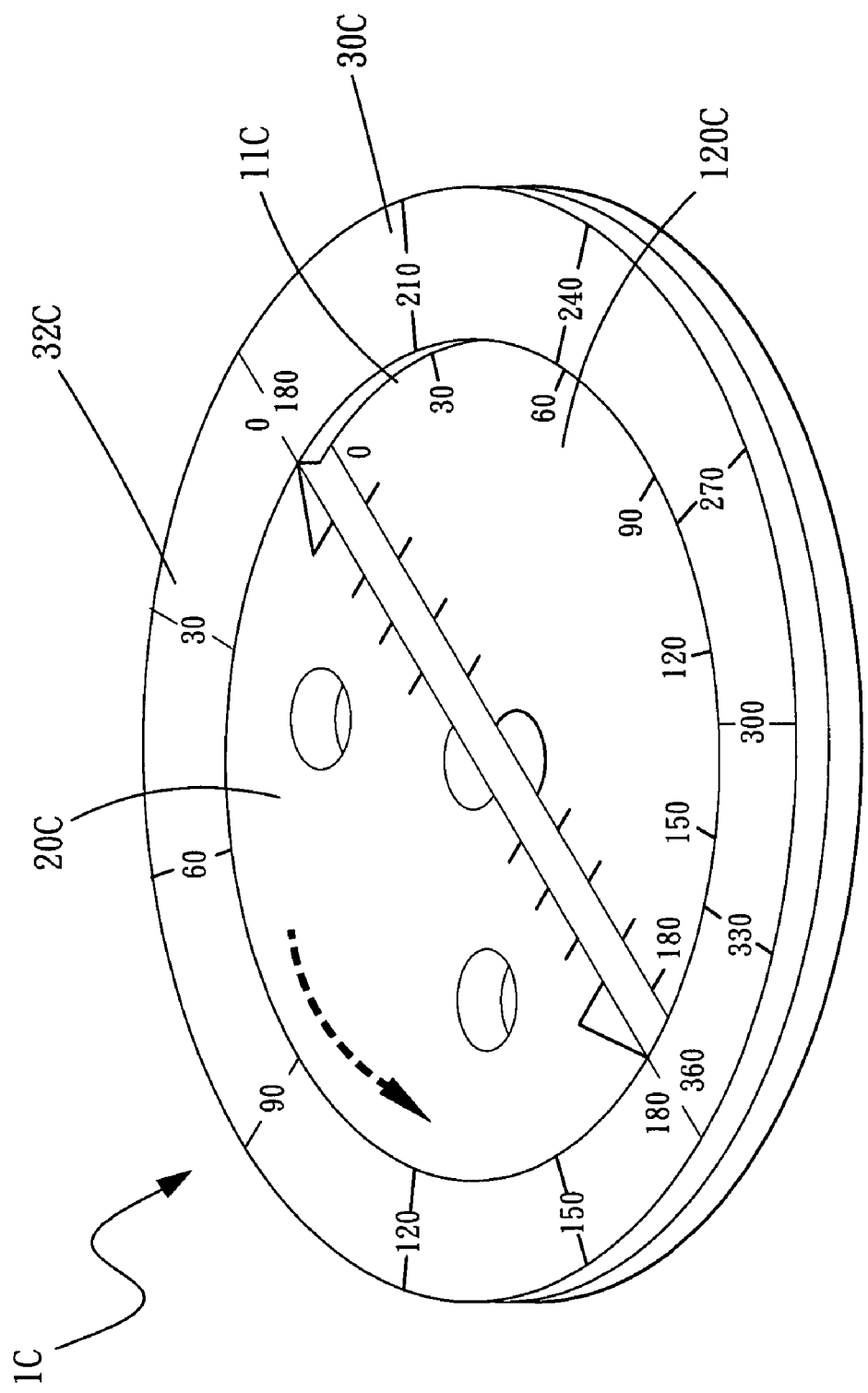
FIG. 9 is a perspective view of the assembly as depicted in FIG. 8.

The upper cover module 30 includes a protruded latch 31 disposed at the bottom and corresponding to the concave hole 13 at the periphery of the horizontal module 10 and coupled with the horizontal module 10. The periphery of the upper cover module 30 includes a calibrated line 32, and the calibrated line 32 is calibrated with (0° and 180°) and (180° and 360°) and corresponding to the left and right ends of the starting edge 122 of the body 120 of the horizontal module 10. The calibrations of 180° and 360° set the exterior angles corresponding to the calibrations of 330°, 300°, 270°, 240°, 210° to 180° (which refers to 0°) in a counterclockwise direction. The calibrated line 32 is arranged as shown in FIG. 9, and its center includes a hollow 33 coupled with the semicircular surface body 22 of the accessory module 20.

Referring to FIG. 2B, a protruded latch 31 is formed at the bottom of the upper cover module 30 facing the concave hole 13 at one side of the depressed surface 11 of the horizontal module 10, such that the upper cover module 30 and the horizontal module 10 can be latched with each other to achieve a good connecting effect. Further, the raised body 21 disposed at the depressed surface 11 on one side of the horizontal module 10 and corresponding to the accessory module 20 can provide a rotation at any direction, and the semicircular surface body 22 extended upward from the raised body 21 of the accessory module 20 matches with and connects to the hollow 33 at the center of the upper cover module 30.

The horizontal module 10 and the upper cover module 30 can be latched by using the protruded latch 31 and concave hole 13, and they also can be latched by a locking device (not shown in the figure, and the locking device may include a thread section on one end and a head section on the other end, and the head section could be rotated by a tool such as a flat-head screwdriver, a Philips head screwdriver, or a hexagonal wrench, so that the thread section of the locking device can pass through a corresponding screw hole of the depressed surface 11 at one side of the horizontal module 10 and presses to connect the upper cover module 30 and the horizontal module 10 by the locking device) or by a rivet to achieve a better connection between the horizontal module 10 and the upper cover module 30

Figure 3:
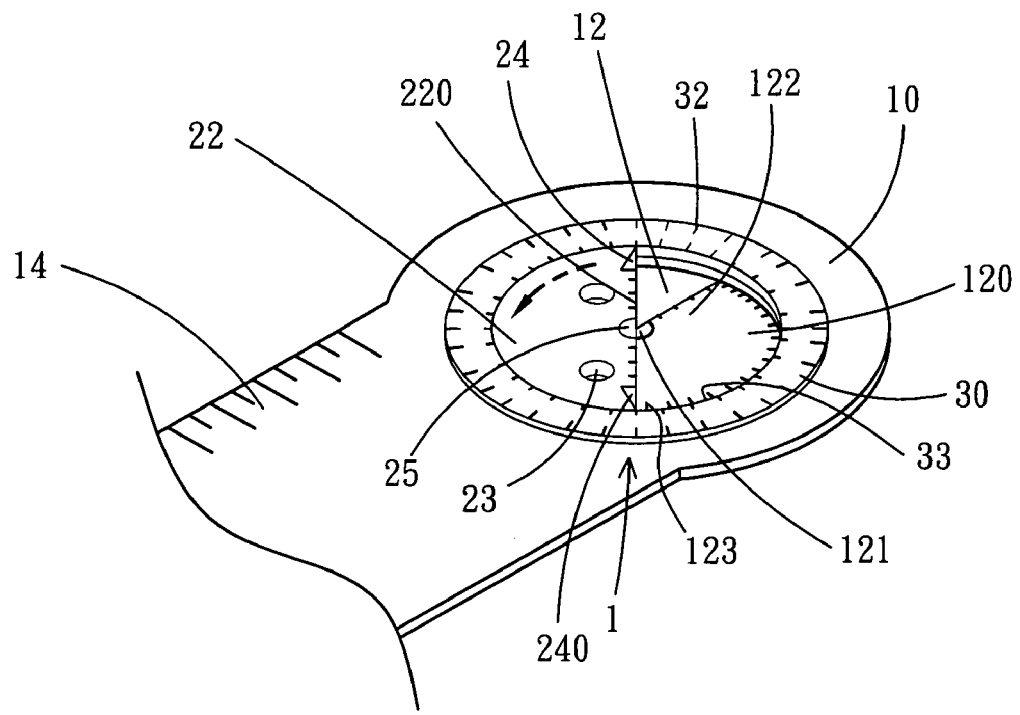
FIG. 3 is a schematic view of an application of the present invention.

Referring to FIG. 3 for the use of the measuring tool device 1, the calibration of 0° marked on the calibrated line 32 at the periphery of the upper cover module 30 is rotated to a desired angle on the left side. Now, the arc 25 at the center of the accessory module 20 and the arc 121 at the center of the body 120 of the horizontal module 10 correspond and situate at the same center, and then the included angle between the starting edge 122 of the body 120 of the horizontal module 10 and the ending edge 220 of the accessory module 20 is used to measure or draw the angle by one stroke. The indicating arrow 24 on the right end shows the required angle (interior angle) and the indicating arrow 240 on the left end indicates the exterior angle. In the meantime, the calibrated line 123 of the body 120 shows the supplementary angle of that angle (0 degree corresponds to the 0° and 180° on the calibrated line 32, and then sets the 180° in a clockwise direction). The horizontal module 10 and the horizontal ruler 14 can be used together to draw a straight line of a specific length, and thus the measuring tool can be used for drawing any angle and a straight line with any specific length.

Figure 4:
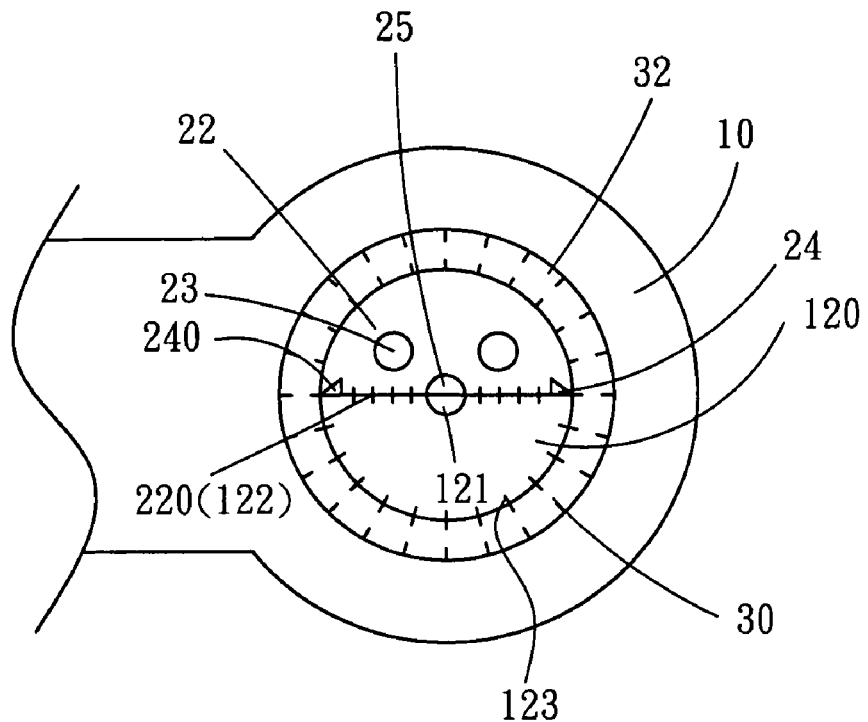
FIG. 4 is a top view of another application of the present invention.
Figure 5:
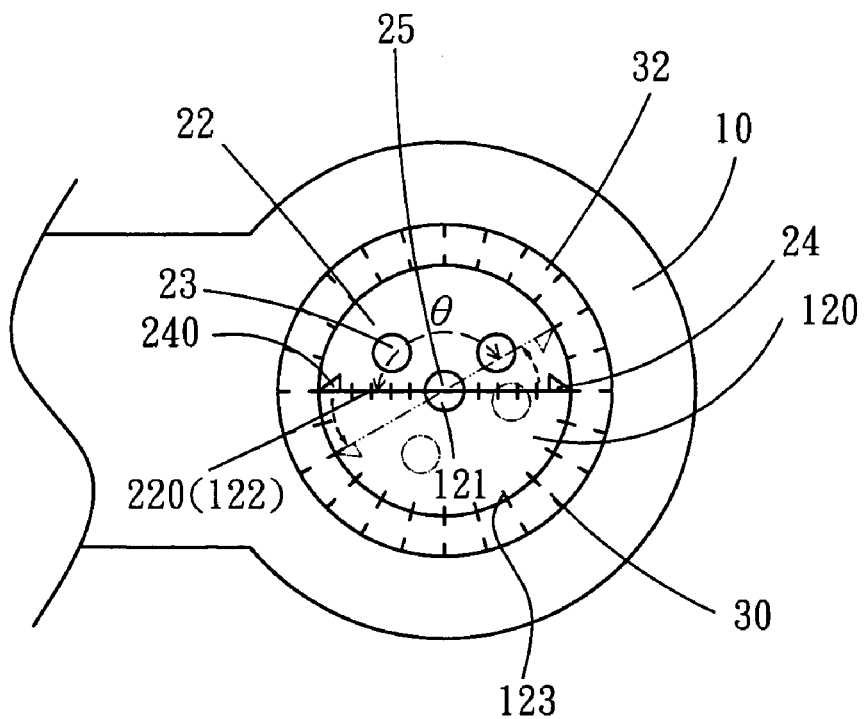
FIG. 5 is a schematic view of a further application of the present invention.

Referring to FIGS. 4 and 5, the measuring tool device 1 can measure the supplementary angle of an acute angle. The indicating arrow 24 of the accessory module 20 shows an acute angle (such as 30°), the accessory module 20 is turned from right to left (or counterclockwise), such that the other indicating arrow 240 maps into a 30° of the calibrated line 32 of the upper cover module 30, and the starting edge 122 of the body 120 and the ending edge 220 of the accessory module 20 measure or draw the supplementary angle θ (which is equal to 150° in this case) of the acute angle.

Figure 6:
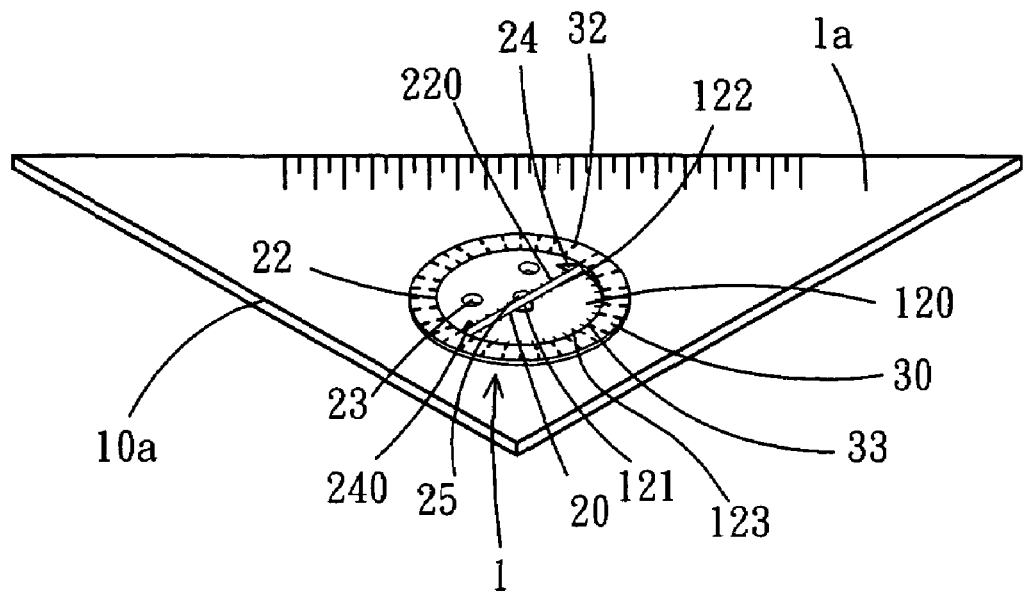
FIG. 6 is a perspective view of another preferred embodiment of the present invention.
Figure 7:
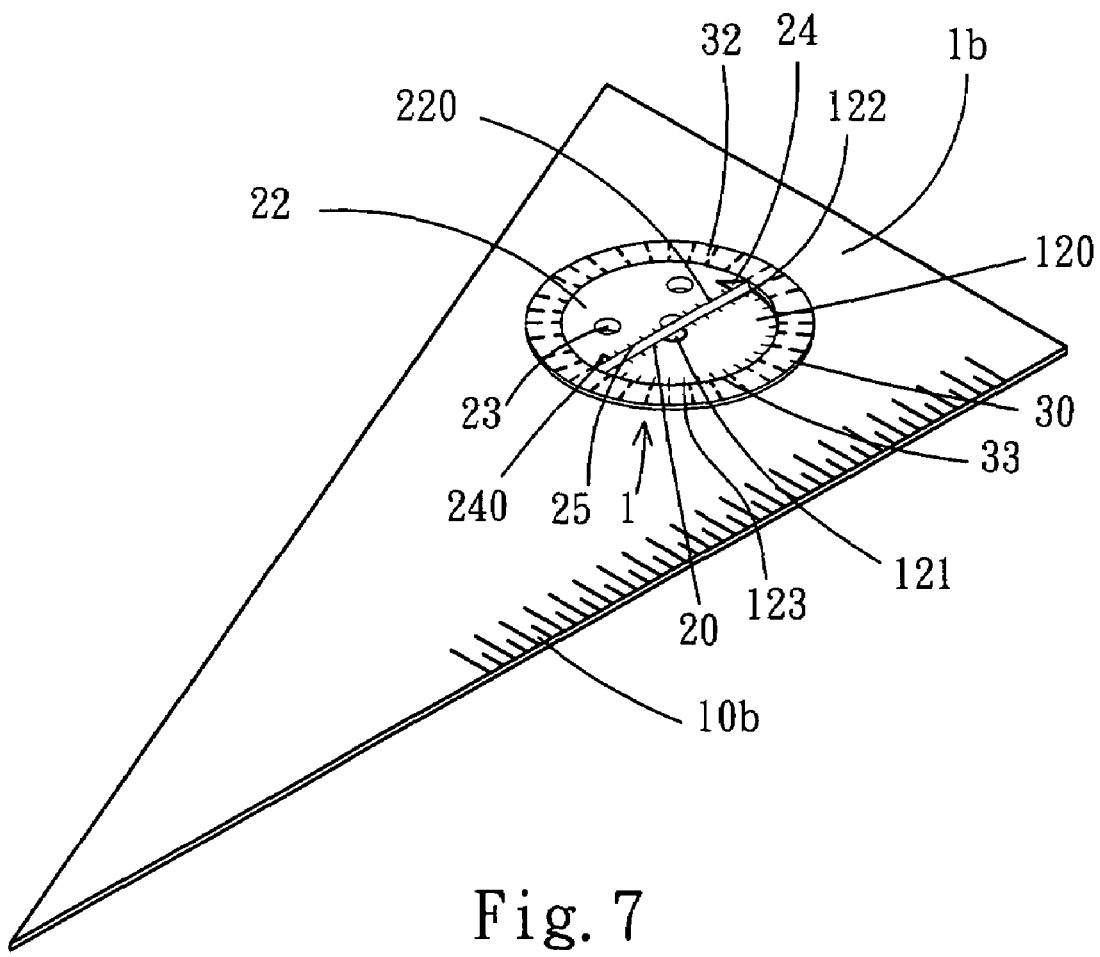
FIG. 7 is a perspective view of another further preferred embodiment of the present invention.

Referring to FIG. 6, the measuring tool device 1 of the present invention can be used together with a triangle gauge 1a (or a right-angle gauge 1b as shown in FIG. 7) or a multi-angle gauge.

Figure 8:
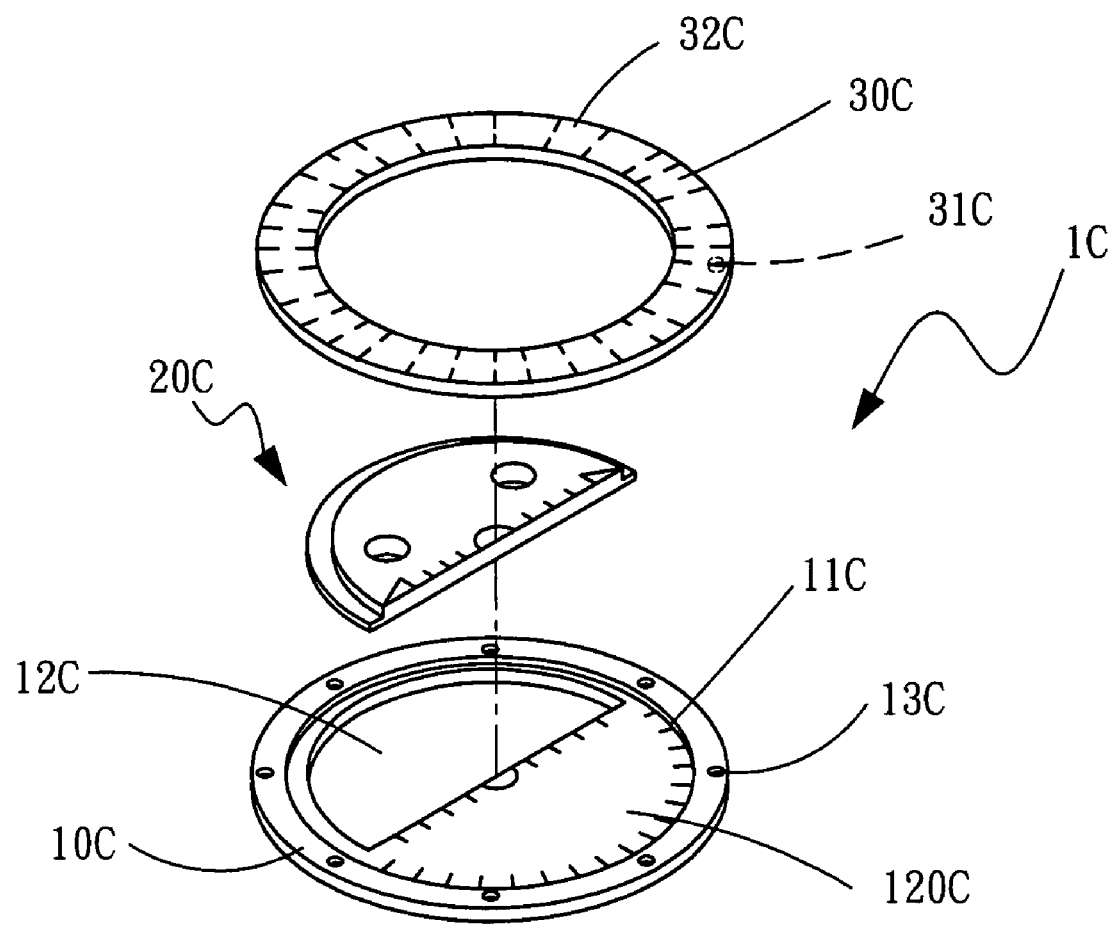
FIG. 8 is an exploded view of another further preferred embodiment of the present invention.

Referring to FIGS. 8 and 9, the measuring tool device 1c of the present invention comprises a depressed surface 11c on one side, an upper semicircular hollow 12c, a circular module 10c disposed at the external periphery of a lower semicircle having a body 120c with a calibrated line, an upper cover module 30c having a calibrated line 32c, and an accessory module 20c being in a semicircular protruded form and connected between the circular module 10c and the upper cover module 30c. The circular module 10c and the upper cover module 30c are coupled with each other by a protruded latch 31c and a concave hole 13c (or a locking device or a rivet, not shown in the figure) for facilitating the rotation of the accessory module 20c between the circular module 10c and the upper cover module 30c to quickly draw any angle.

What is claimed is:

1. A measuring tool, comprising:
    a horizontal module, having a depressed surface disposed on a side of said horizontal module, an upper semicircular hollow and a lower semicircular body disposed thereon, a plurality of concaves holes disposed around the periphery of said horizontal module, and a horizontal ruler extended outward from another side of said horizontal module;
    an accessory module, disposed at said depressed surface on one side of said horizontal module; and
    an upper cover module, including a protruded latch disposed at the bottom of said upper cover module and corresponding to said concave hole at the periphery of said horizontal module and coupled with said horizontal module.

2. The measuring tool device of claim 1, wherein said body includes an arc at the center of said body, and a starting edge disposed on both sides of said arc and having a calibration, and the external periphery of said arc includes an arc having a calibrated line disposed at the central distal surface.

3. The measuring tool device of claim 1, wherein said accessory module is a semicircular raised body.

4. The measuring tool device of claim 3, wherein said raised body includes semicircular surface body extended upward from said raised body, an ending edge disposed on one side and having a straight edge, an indicating arrow disposed separately on both ends of said ending edge, and an arc disposed at the center and corresponding to said arc at the center of said body of said horizontal module.

5. The measuring tool device of claim 1, wherein said upper cover module includes a hollow disposed at the center of said upper cover module and coupled to said semicircular surface body of said accessory module.

6. The measuring tool device of claim 1, wherein said measuring tool device is installed onto a triangle gauge.

7. The measuring tool device of claim 6, wherein said measuring tool device is installed onto a right-angle gauge.

8. The measuring tool device of claim 6, wherein said measuring tool device is installed onto a multi-angle gauge.

9. The measuring tool device of claim 1, wherein said measuring tool device comprises a depressed surface disposed on one side, an upper semicircular hollow, and a circular module having a calibrated line disposed at the external periphery of a lower semicircle as a body, an upper cover module having a calibrated line disposed at the periphery of said upper cover module, and an accessory module substantially in a semicircular protruded form and coupled between said circular module and said upper cover module.

10. The measuring tool device of claim 9, wherein said upper cover module includes a calibrated line disposed at the periphery of said upper cover module, and said calibrated line includes the calibrations of 0 and 180 degrees and 180 and 360 degrees separately disposed on both ends of said starting edge corresponding to the straight edge of said body of said circular module.

* * * * *